United States Patent
Okutsu et al.

(10) Patent No.: US 8,750,610 B2
(45) Date of Patent: Jun. 10, 2014

(54) WHITE ADJUSTING DEVICE, WHITE ADJUSTING METHOD, AND NON-TRANSITORY COMPUTER READABLE MEDIUM

(75) Inventors: Masaru Okutsu, Kanagawa (JP); Masaomi Sakamoto, Kanagawa (JP); Makoto Sasaki, Kanagawa (JP); Daigo Hama, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 110 days.

(21) Appl. No.: 13/360,122

(22) Filed: Jan. 27, 2012

(65) Prior Publication Data
US 2013/0016904 A1    Jan. 17, 2013

(30) Foreign Application Priority Data
Jul. 12, 2011 (JP) .................. 2011-153776

(51) Int. Cl.
*G06K 9/00* (2006.01)

(52) U.S. Cl.
USPC ........................................................ 382/167

(58) Field of Classification Search
None
See application file for complete search history.

(56) References Cited

U.S. PATENT DOCUMENTS

| | | | | |
|---|---|---|---|---|
| 5,021,874 A | * | 6/1991 | Tsugita | 348/227.1 |
| 6,069,972 A | * | 5/2000 | Durg et al. | 382/167 |
| 7,162,078 B2 | * | 1/2007 | Cheng | 382/167 |
| 2003/0090750 A1 | * | 5/2003 | Takahashi | 358/516 |
| 2003/0169348 A1 | * | 9/2003 | Ikeda et al. | 348/223.1 |
| 2005/0195290 A1 | * | 9/2005 | Takeshita | 348/223.1 |
| 2006/0078216 A1 | * | 4/2006 | Kaku | 382/254 |
| 2006/0262197 A1 | | 11/2006 | Uezono | |
| 2006/0267985 A1 | * | 11/2006 | Brodie et al. | 345/442 |
| 2006/0284991 A1 | * | 12/2006 | Ikeda | 348/223.1 |
| 2008/0143851 A1 | * | 6/2008 | Shi | 348/223.1 |
| 2009/0231462 A1 | * | 9/2009 | Kitajima | 348/223.1 |

FOREIGN PATENT DOCUMENTS

| | | |
|---|---|---|
| JP | A-2002-135802 | 5/2002 |
| JP | A-2006-324840 | 11/2006 |
| JP | A-2007-300184 | 11/2007 |
| JP | A-2008-148009 | 6/2008 |

\* cited by examiner

*Primary Examiner* — Bhavesh Mehta
*Assistant Examiner* — Feng Niu
(74) *Attorney, Agent, or Firm* — Oliff PLC

(57) ABSTRACT

A white adjusting device performs with adjustment on an image. The white adjustment device includes an estimation unit that estimates a color temperature of an image to be processed, an acquisition unit that acquires a representative color value from a region close to white which is a region in which a color in a color range predetermined from a preset white color value of the image exists, a calculation unit that calculates a correction representative color value from a color value corresponding to the color temperature estimated in the estimation unit and the representative color value acquired in the acquisition unit, and a conversion unit that converts a color of the image so that the correction representative color value is set to the white color value.

8 Claims, 7 Drawing Sheets

WHITE ADJUSTING DEVICE, WHITE ADJUSTING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2011-153776 filed Jul. 12, 2011.

BACKGROUND (i) Technical Field

The present invention relates to a white adjusting device, a white adjusting method and a non-transitory computer readable medium.

(ii) Related Art

From the past, white adjustment known as white balance or the like has been performed on an image. For example, in a photographed image, a white color value changes depending on a light source for illuminating an object to be shot. The white color varying according to this light source is adjusted to a predetermined white color. Of course, in the case of the sunlight, white adjustment is required according to the shooting conditions such as sunny, cloudy, and morning and evening, and white adjustment is performed including light in each of such shooting conditions as the light source. The collapse of the white color balance is visually sensitive, and influences the image quality.

When a used light source is not known at the time of performing such white adjustment, it is necessary to estimate the used light source from an image to be adjusted. As a method for this, the temperature (color temperature) of the light source is estimated from the color of a region considered to be white in an image, based on the correspondence of the color of the light source to the color of light emitted from a black body serving as a heat source, and white adjustment based on the estimated color temperature is performed.

When the chromaticity of a black-body radiation is used, the use of a light source which generates heat is premised. However, for example, a fluorescent light may be used indoors, or a light source equipped with a filter may be used. Even though the color temperature of the light source is estimated based on black-body radiation when these light sources are used, the white color may not be corrected.

SUMMARY

According to an aspect of the invention, there is provided a white adjusting device including: an estimation unit that estimates a color temperature from an image to be processed; an acquisition unit that acquires a representative color value from a region close to white which is a region in which a color in a color range predetermined from a preset white color value of the image exists; a calculation unit that calculates a correction representative color value from a color value corresponding to the color temperature estimated in the estimation unit and the representative color value acquired in the acquisition unit; and a conversion unit that converts a color of the image so that the correction representative color value is set to the white color value.

BRIEF DESCRIPTION OF THE DRAWINGS

Exemplary embodiments of the present invention will be described in detail based on the following figures, wherein.

DETAILED DESCRIPTION

Figure 1:
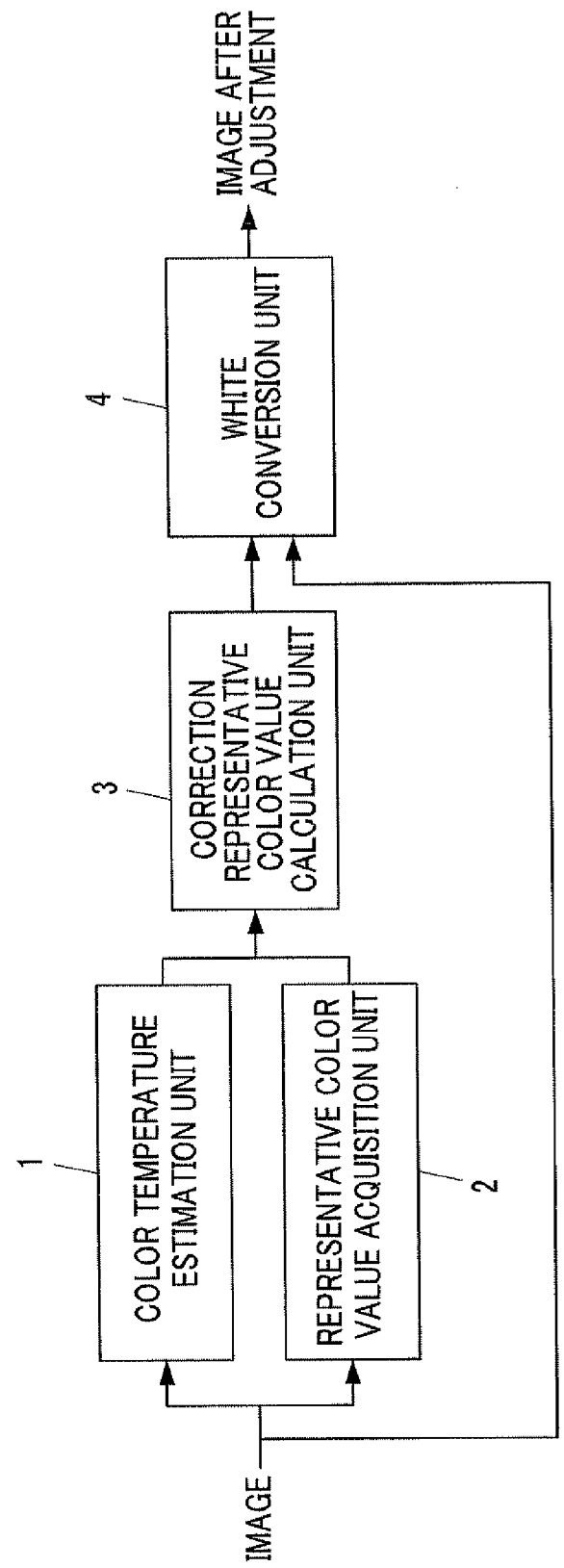
FIG. 1 is a configuration diagram illustrating an exemplary embodiment of the invention.

FIG. 1 is a configuration diagram illustrating an exemplary embodiment of the invention. In the drawing, 1 denotes a color temperature estimation unit, 2 denotes a representative color value acquisition unit, 3 denotes a correction representative color value calculation unit, and 4 denotes a white conversion unit. The color temperature estimation unit 1 estimates the color temperature of an image to be processed. As an estimation method, a method used performed from the past may be used. For example, there may be used a method disclosed in JP-A-2008-148009, that is, a method of extracting a pixel for use in the estimation of a white point to calculate a weighted average color temperature weighted with respect to a color temperature value of the pixel.

The representative color value acquisition unit 2 acquires a representative color value from the color value of a pixel serving as a region close to white which is a region where the color in a color range predetermined from a preset white color value of color values in each pixel of the image to be processed exists. For the representative color value, for example, a color value calculated by performing weighting based on the color difference between the color value of the pixel serving as the region close to white and the preset white color value may be acquired as a representative color value.

The correction representative color value calculation unit 3 calculates a correction representative color value from the color value corresponding to the color temperature estimated in the color temperature estimation unit 1 and the representative color value acquired in the representative color value acquisition unit 2. When the correction representative color value is calculated, for example, weighting based on the color temperature estimated in the color temperature estimation unit 1 may be performed. In addition, other indexes such as the rate at which the representative color value is used in the image and the rate at which the color value corresponding to the color temperature exists in the image may be used, or may be used in combination thereof.

The white conversion unit 4 performs a color conversion, which converts the correction representative color value calculated in the correction representative color value calculation unit 3 into the preset white color value, on the image to be processed. Thereby, the white adjustment for the image is performed. In the color conversion processing, an existing color conversion technique may be used.

Figure 2:
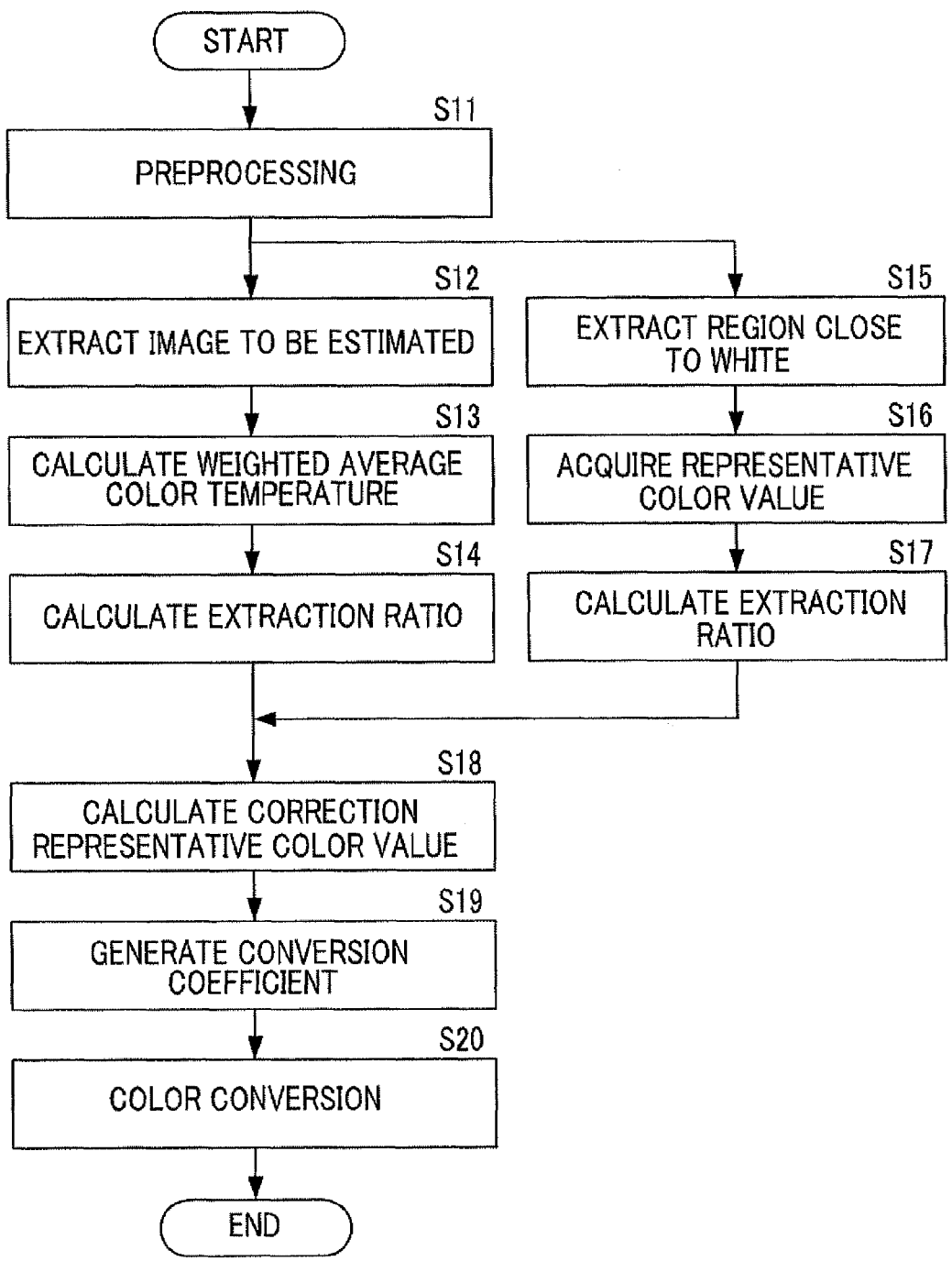
FIG. 2 is a flow diagram illustrating an example of an operation in the exemplary embodiment of the invention.

FIG. 2 is a flow diagram illustrating an example of an operation in exemplary embodiment of the invention. In the following description, the color value to be a target of correction as the white color is preset as a white color value. There are various methods such as, for example, a method of setting the white color value depending on the color temperature, or a method of setting the white color value as the origin in the color coordinate system.

When the image to be processed is given, preprocessing maybe performed on the given image in step S11. For example, the processing amount until the correction representative color value is obtained by thinning out the pixels may be made smaller than a case where the thinning-out is not performed. Of course, when the preprocessing is not necessary, step S11 may be not performed.

The color temperature estimation unit 1 estimates the color temperature from the image to be processed. Here, the color temperature is estimated using the image after the preprocessing is performed in step S11 instead of the given image to be processed. In addition, a method disclosed in JP-A-2008-148009 is used as an example of a method of estimating the color temperature, to first extract a pixel used in the estimation of a white point in step S12. In step S13, the weighted average color temperature weighted with respect to the color temperature value of the pixel extracted in step S12 is then calculated, and this weighted average color temperature is set to the color temperature estimated in the color temperature estimation unit 1. The weight is set to 1 in a predetermined range of the color temperature, and the decreasing weight with increasing distance from the range of the color temperature may be used. Further, in step S14, the ratio between the number of pixels used in the estimation of the color temperature and the number of pixels of the entire image to be processed (image after the preprocessing when the preprocessing is performed in step S11) is calculated.

On the other hand, the representative color value acquisition unit 2 acquires the representative color value from the image to be processed. Here, the representative color value is acquired using the image after the preprocessing is performed in step S11 instead of the given image to be processed. First, in step S15, the region of the pixel having a color value of the color range predetermined from the white color value is extracted as the region close to white from the image to be processed (image after the preprocessing is performed). In step S16, the representative color value is then acquired from the color value of the pixel within the region close to white extracted in step S15. For example, the average value of the color values may be acquired as the representative color value, and the color value weight-averaged by performing weighting based on the color difference between the color value of the pixel and the white color value may be acquired as the representative color value.

Figure 3:
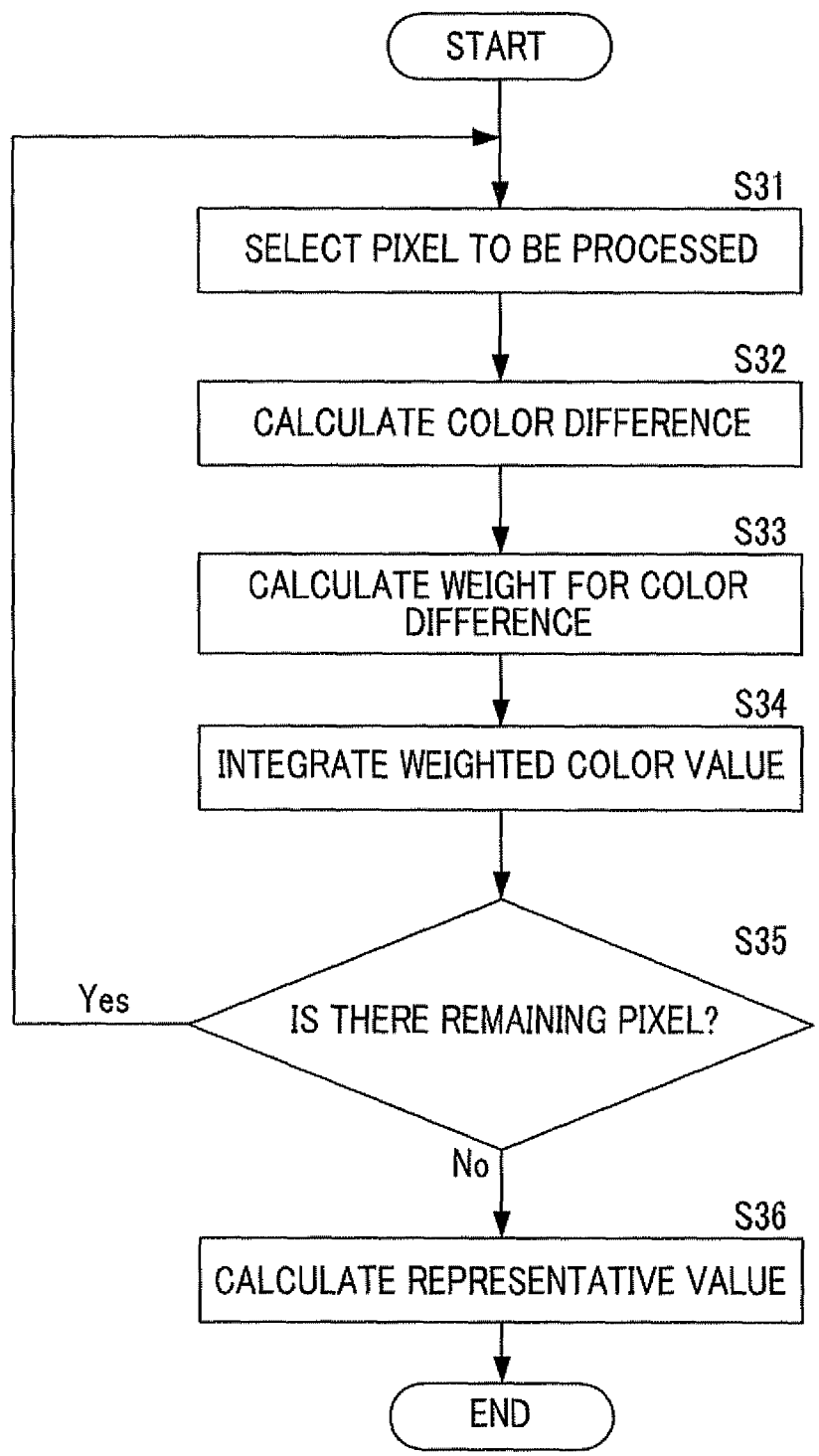
FIG. 3 is a flow diagram illustrating an example of an operation of a representative color value acquisition unit.

FIG. 3 is a flow diagram illustrating an example of an operation of the representative color value acquisition unit. An example of the operation in step S16 of FIG. 2 is shown in FIG. 3. Meanwhile, as a specific example, the image to be processed (image after the preprocessing is performed) is an image of a YCbCr color space. Of course, the image to be processed is not limited to the image of the YCbCr color space. In addition, when the color space of the image and the color space used in the processing of acquiring the representative color value are different from each other, conversion processing of the color space may be performed prior to the processing shown in FIG. 3 or the processing in step S15 of FIG. 2.

First, in step S31, pixels to be processed are selected in order from the pixel of the region close to white, and the pixels are set to a selection pixel.

In step S32, the color difference between the color value of the selection pixel and the white color value is calculated. For example, when Cb=Cr=0 is set as the white color value, the color difference d may be calculated by the following expression.

$$d = \sqrt{Cb^2 + Cr^2}$$

The original color difference is also used in a Y component, but is relevant to the white adjustment. Therefore, in the specific example, the distance from the Y-axis may be used instead of the color difference.

In step S33, the weight based on the color difference calculated in step S32 is calculated. The weight may be calculated by a decreasing function as the color difference increases. As an example, the weight w may be obtained by the following expression using the color difference as d mentioned above.

$$w = 1/\{1 + (d/inf)\}^G$$

Figure 4:
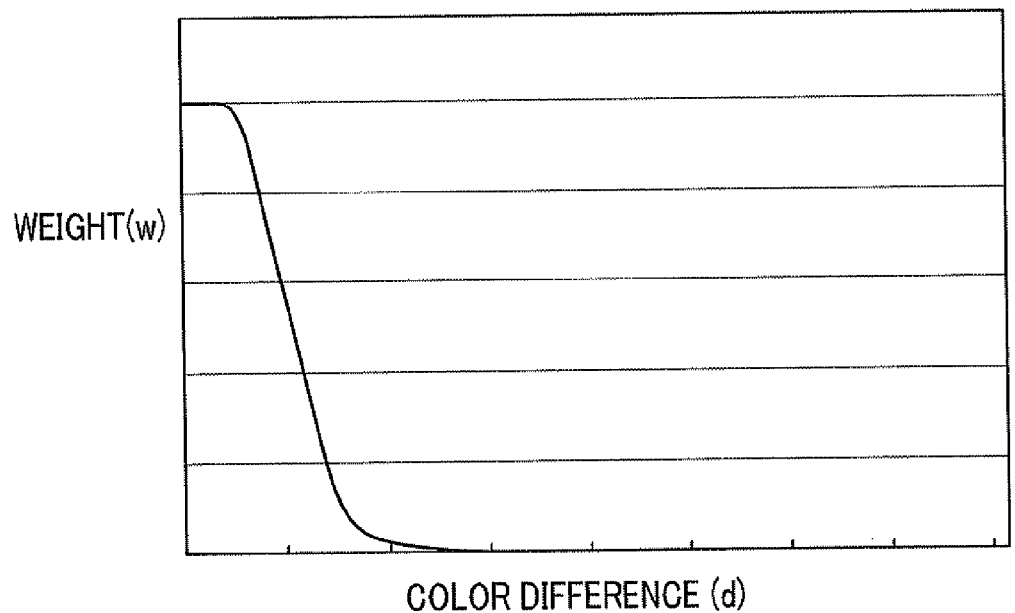
FIG. 4 is an explanatory diagram illustrating an example of a weight used at the time of calculating a color value which is a representative color value.

Here, inf and G are constants, and these constants may be changed at the time of changing the weight for the color difference. FIG. 4 is an explanatory diagram illustrating an example of a weight used at the time of calculating a color value which is a representative color value. In the expression for obtaining the above-mentioned weight w, the relationship between the color difference d and the weight w when a certain value is set as the constants inf and G is shown. It is known that the weight w decreases as the color difference d increases. Of course, the function for calculating the weight is not limited to this example.

In step S34, the color value of the pixel is weighted and integrated using the weight calculated in step S33. For example, when an integrated value of the Cb component is set to WCb, an integrated value of the Cr component is set to WCr, and the Cb and Cr components of the color value of the pixel are set to cb and cr, the integrated values may be calculated by the following expressions using the weight w.

$$WCb = WCb + w \cdot cb$$

$$WCr = WCr + w \cdot cr$$

In addition, when the sum of the weights is set to Wsum, this value is also obtained by the following expression.

$$Wsum = Wsum + w$$

Meanwhile, the calculation of the integrated value in step S34 may be performed on the pixel of which the Y component is larger than a predetermined value. The pixel, darker than a pixel which satisfies such conditions, of which the Y component is a predetermined value or less may be excluded because it is not white. When the region close to white is extracted considering the brightness at the time of the extraction thereof in step S15 of FIG. 2, the Y component is in a certain range, and the Y component may not be considered in step S34.

In step S35, it is determined whether the pixels which are not selected remain, and processing for these pixels is continued back to step S31 when the pixels remain. When the selection of the pixels is terminated, the average value is calculated in step S36. The following expressions are obtained in the processing so far.

$$WCb = \Sigma w \cdot cb$$

$$WCr = \Sigma w \cdot cr$$

$$Wsum = \Sigma w$$

For example, when an average value of the Cb component is set to mCb, and an average value of the Cr component is set to mCr, the average values may be calculated by the following expressions.

$$mCb = WCb/Wsum$$

$$mCr = WCr/Wsum$$

The color value in which the calculated values mCb and mCr are used as a component may be acquired as a representative color value.

Meanwhile, in an example of the processing shown in FIG. 3, since the decreasing weight with increasing distance from the Y-axis is used, for example, the setting of the weight w to 0 does not influence the acquisition of the representative color value. Therefore, according to the function of the weight w, a function of extracting the pixel of the region close to white in step S15 of FIG. 2 is also included, and in this case, the processing shown in FIG. 3 may be performed on the image to be processed (image after the preprocessing is performed) without performing the processing in step S15 of FIG. 2. Moreover, in this case, a configuration may be provided in which the pixels of which the above-mentioned Y component has a value larger than a predetermined value are integrated.

In addition, using the color difference calculated in step S32, it is determined to be a pixel of the region close to white when the color difference is a predetermined value or less, and the processing may proceed to step S35 when the color difference exceeds the predetermined value. Even in this case, the processing shown in FIG. 3 may be performed on the image to be processed (image after the preprocessing is performed) without performing the processing in step S15 of FIG. 2.

Of course, when the processing shown in FIG. 3 is performed on the pixel of the region close to white extracted by performing the processing in step S15 of FIG. 2, the number of pixels to be processed decreases compared to a case in which the extraction is not performed, and the representative color value limited to the color value of the region close to white is acquired.

Returning to FIG. 2, in step S17, the ratio between the number of pixels used at the time of acquiring the representative color value and the number of pixels of the entire image to be processed (image after the preprocessing) is calculated.

In step S18, the correction representative color value calculation unit 3 calculates a correction representative color value from the color value corresponding to the color temperature estimated in the color temperature estimation unit and the representative color value acquired in the representative color value acquisition unit 2. For example, in the correction representative color value calculation unit 3, when the CbCr component of the color value corresponding to the color temperature estimated in the color temperature estimation unit 1 is set to tCb and tCr, the CbCr component of the representative color value acquired in the representative color value acquisition unit 2 is set to mCb and mCr, and the weight is set to w, cCb and cCr, which are the CbCr component of the correction representative color value, may be calculated by the following expressions.

$$cCb = tCb \cdot (1-w) + mCb \cdot w$$

$$cCr = tCr \cdot (1-w) + mCr \cdot w$$

In this example, the representative color value is selected when the weight w is 1, and the color value corresponding to the estimated color temperature is selected when the weight w is 0. In addition, when the weight w is smaller than 1 and larger than 0, the color value corresponding to the color temperature and the representative color value become linearly-interpolated values depending on the weight w.

Figure 5:
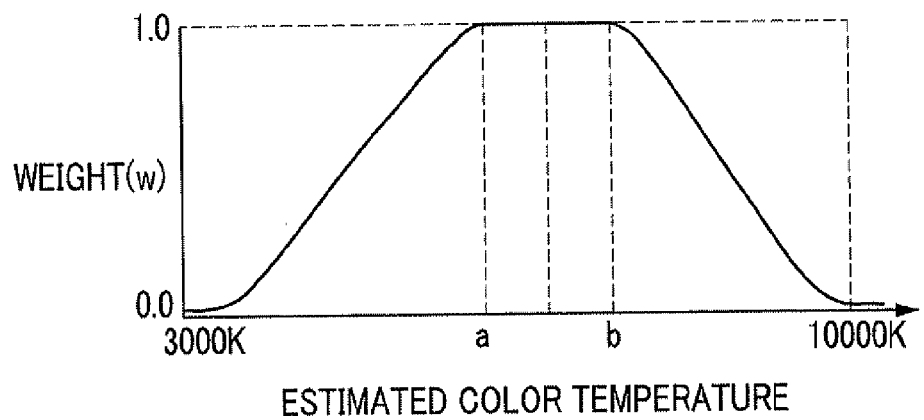
FIG. 5 is an explanatory diagram illustrating an example of a function for obtaining a weight used at the time of calculating a correction representative color value.

FIG. 5 is an explanatory diagram illustrating an example of a function for obtaining a weight used at the time of calculating the correction representative color value. The weight w used at the time of calculating the correction representative color value by the above-mentioned expressions may be acquired using a predetermined value or a function. For example, the weight may be acquired by the function shown in FIG. 5. In the example shown in FIG. 5, the example of acquiring a weight corresponding to the color temperature estimated in the color temperature estimation unit 1 is shown, and the weight is set to 1 in the color temperature a or higher and the color temperature b or lower. In addition, when the color temperature is lower than the color temperature a, the weight w decreases with increasing difference between the color temperature and the color temperature a. When the color temperature is higher than the color temperature b, the weight w decreases with increasing difference between the color temperature and the color temperature b.

The color temperature which is a white point may be included in the range of the color temperature based on the color temperature a and the color temperature b. In the expressions for obtaining the above-mentioned correction representative color value, the weight w is 1 in the range of the color temperature a and the color temperature b including a white point and thus the representative color value is selected. In addition, when the color temperature is lower than the color temperature a and the color temperature is higher than the color temperature b, the weight w decreases with increasing distance from the range of the color temperature a and the color temperature b, that is, increasing distance from the white point, and is further influenced by the estimated color temperature. When the weight w is 0, the estimated color temperature is selected.

Figure 6:
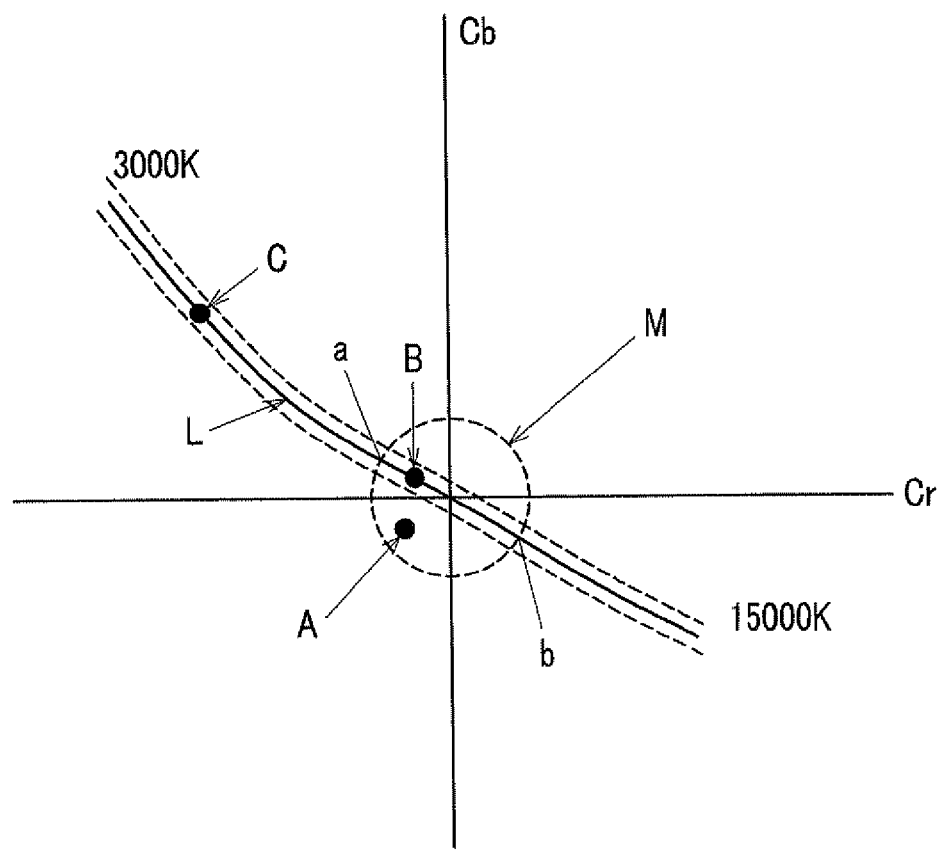
FIG. 6 is an explanatory diagram illustrating an example of a relationship between an extracted color temperature and a representative color value.

FIG. 6 is an explanatory diagram illustrating an example of a relationship between the extracted color temperature and the representative color value. FIG. 6 shows the Cb-Cr plane in the YCbCr color space, and the curve L is a trajectory of the color value corresponding to the color temperature. In addition, M shows an example of the color range used at the time of extracting the region close to white in the representative color value acquisition unit 2. The color temperatures at the edge of the color range are set to the color temperature a and the color temperature b, respectively, in FIG. 5. The color value A is the representative color value acquired in the representative color value acquisition unit 2. Meanwhile, the preset white point is Cb=Cr=0.

A description will be made of a case in which the color value corresponding to the color temperature estimated in the color temperature estimation unit 1 is the color value B and a case in which it is the color value C. When the color value corresponding to the color temperature estimated in the color temperature estimation unit 1 is the color value B, it is a color value in the color range of the color temperature a and the color temperature b, and thus the weight w becomes 1 from the function of the weight w shown in FIG. 5. Therefore, the representative color value acquired in the representative color value acquisition unit 2 is selected and set to the correction representative color value. In this case, a case is assumed in which a fluorescent light or the like which is not a thermal light source is used as a light source, or a filter is used, and the color temperature based on a thermal light source is incorrectly estimated.

When the light source which is not a thermal light source is used or a filter is used, a region which is originally white is colored, but the color may be a color different from the color corresponding to the color temperature based on the thermal light source. For example, when a fluorescent light is used, the white color becomes a greenish color, but the color is a color different from the color corresponding to the color temperature based on the thermal light source. In such a case, for example, the greenish color when a fluorescent light is used is acquired as the representative color value (for example, color value A of FIG. 6), the color value (for example, color value B of FIG. 6) corresponding to the incorrectly estimated color temperature based on the thermal light source is not selected.

In addition, when the color value corresponding to the color temperature estimated in the color temperature estimation unit 1 is the color value C, the estimated color temperature is a temperature lower than the color temperature a, and thus the weight w becomes smaller than 1 from the function of the weight w shown in FIG. 5. Therefore, the interpolation thereof is performed from the color value corresponding to the color temperature estimated by the weight w and the representative color value. As the temperature difference from the color temperature a increases, the weight w becomes a small value, and thus the correction representative color value approaches the color value corresponding to the estimated color temperature. When the weight w is 0, the color value corresponding to the estimated color temperature becomes a correction representative color value. In this case, since the representative color value is acquired from the color in the color range which is preset from the white color value, a case in which the influence of a light source extends beyond this color range is assumed, and priority is given to the color value of the estimated color temperature.

For example, an image obtained using tungsten light, which is a thermal light source, becomes a reddish image due to the color temperature of the light source. In this case, as the color value corresponding to the estimated color temperature, for example, the color value C of FIG. 6 is obtained. When a pixel of the color in the range predetermined from the white color value is extracted from such an image to acquire the representative color value (for example, acquire the color value A of FIG. 6), it is assumed that the color influenced by the light source is not acquired in this representative color value. Therefore, in such a case, the color value corresponding to the estimated color temperature is set to the correction representative color value as a priority.

In the above-mentioned example, the weight w is calculated from the estimated color temperature, and the correction representative color value is calculated using the weight w. However, for example, other indexes such as the rate at which the representative color value is used in the image and the rate at which the color value corresponding to the color temperature exists in the image may be used or may be used in combination thereof, without being limited thereto, to calculate the correction representative color value. In addition, the representative color value may be set to the correct representative color value when the rate of the number of pixels used in the estimation of the color temperature calculated in step S14 of FIG. 2 is smaller than a predetermined rate, or the color value corresponding to the estimated color temperature may be set to the correction representative color value when the rate of the number of pixels used at the time of acquiring the representative color value in step S17 of FIG. 2 is smaller than a predetermined rate.

Returning to FIG. 2, when the correction representative color value is calculated in step S18, the white conversion unit 4 generates a conversion coefficient for setting the correction representative color value to a preset white color value in step S19, and performs color conversion processing in step S20 on the image to be processed given using the conversion coefficient. The white adjustment is performed by the color conversion processing.

Figure 7A:
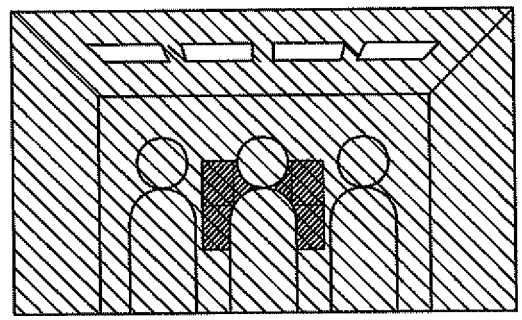
FIGS. 7A to 7D are explanatory diagrams illustrating an example of processing in a specific example of an image.
Figure 7B:
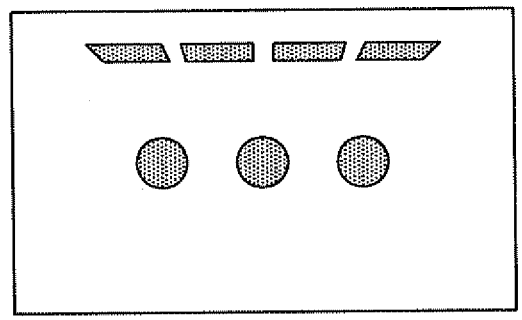
Figure 7C:
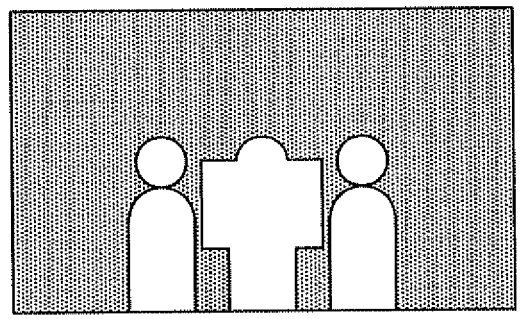

FIGS. 7A to 7D are explanatory diagrams illustrating an example of processing in a specific example of an image. FIG. 7A shows an example of the image to be processed. This image is an image in which characters are photographed under the illumination of a fluorescent light in the interior of a room having a window and white wallpaper. The entire image is greenish due to the influence of the fluorescent light, and the greenish portion is shown by the diagonal line for convenience of illustration. Meanwhile, when the preprocessing is performed, FIG. 7A is an image in which the preprocessing is performed.

In the color temperature estimation unit 1, the color temperature of the thermal light source is estimated from the image shown in FIG. 7A. The estimation of the color temperature is performed, for example, based on the color of the color region along the trajectory of the color temperature of the thermal light source shown by the curve L in FIG. 6. For this reason, in the estimation of the color temperature, regions shown gray in FIG. 7B, for example, regions such as the light source portion of a fluorescent light or faces of the characters are used in the estimation of the color temperature. For this example, the color temperature of approximately 6000K is estimated from the color of the light source portion of the fluorescent light.

On the other hand, in the representative color value acquisition unit 2, the region close to white is extracted from the image shown in FIG. 7A, to acquire the representative color value from the region. An example of the region close to white is shown gray in FIG. 7C. In this case, the light source portion of a fluorescent light, the surface of a wall illuminated with the fluorescent light, and the like are included therein. When the representative color value is acquired from this region close to white, the greenish color value is acquired as the representative color value due to the influence of the fluorescent light.

For example, when the preset white color value is a color value corresponding to the color temperature of 6500K, the color temperature estimated in the color temperature estimation unit 1 is close to the white color value, compared to 3500K and the like which is, for example, the color temperature of a tungsten light source. Therefore, the weight w calculated in the correction representative color value calculation unit 3 becomes 1 or is a value close to 1, and the representative color value becomes a preferential correction representative color value.

Figure 7D:
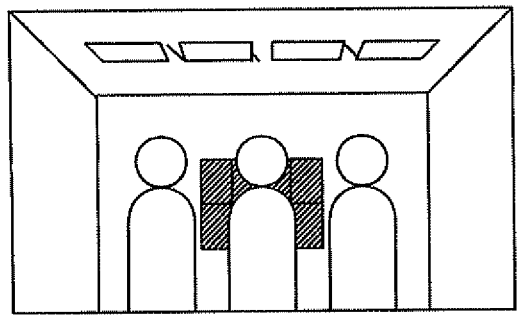

Consequently, a conversion coefficient converted from the color value greenish due to the influence of the fluorescent light to the preset white color value is calculated, and color conversion processing for correcting the white color is performed. Thereby, as shown in FIG. 7D, an image corrected to the white color in which the greenish white color is set is obtained. For convenience of illustration, FIG. 7D shows an image corrected by excluding the diagonal line in comparison with FIG. 7A.

In this specific example, the color value B in FIG. 6 corresponds to the color value of the color temperature estimated in the color temperature estimation unit 1, and the color value A corresponds to the representative color value acquired in the representative color value acquisition unit 2. When the white color value is set to a point of Cb=Cr=0, processing of the color conversion from the color value A to the point of Cb=Cr=0 is performed. When the estimated color temperature is used, processing of the color conversion from the color value B to the point of Cb=Cr=0 is performed. Therefore, the greenish color is converted into another color and thus does not become white. The processing of the color conversion from the color value B to the point of Cb=Cr=0 is performed, whereby the greenish color is corrected to the white color.

For example, even in the image which is shot using a filter, the color of the used filter influences the entirety of the image. In this case, the influence of the color of the filter is not also estimated from the trajectory of the color temperature based on the thermal light source, the color value due to the influence of the filter is acquired as the representative color value in the representative color value acquisition unit 2, and the white adjustment is performed.

Moreover, for example, in the image which is shot using a tungsten light source, the color temperature of the tungsten light source is estimated in the color temperature estimation unit 1. However, the color value corresponding to this color temperature has a difference in the color from the point of Cb=Cr=0 larger than the case in which the above-mentioned fluorescent light is used, and has, for example, a relationship between the color value A and the color value C of FIG. 6. In such a case, the color value corresponding to the estimated color temperature becomes the correction representative color value as a priority, and the white color is corrected based on the color temperature of the tungsten light source. In addition, when a pixel of the range in which the color difference from the white color value is predetermined is extracted as the region close to white in the representative color value acquisition unit 2, the color value of the portion illuminated with the tungsten light source is out of the color range, the pixel influenced by the illumination is not included in the region close to white. For this reason, the ratio of the region close to white occupied in the entirety of the image is smaller than the example shown in FIGS. 7A to 7D. In such a case, the color value corresponding to the estimated color temperature is set to the correction representative color value without regard for the representative color value in the correction representative color value calculation unit 3, and the correction of the white color may be performed.

Naturally, in an image or the like which is shot based on the sunlight, the color value corresponding to the color temperature estimated in the color temperature estimation unit and the representative color value acquired in the representative color value acquisition unit 2 have a difference smaller than those of any of the examples mentioned above, and the correction representative color value also becomes a color value which is not changed to the color value corresponding to the estimated color temperature and the representative color value, whereby the correction of the white color is performed without any difficulty.

Figure 8:
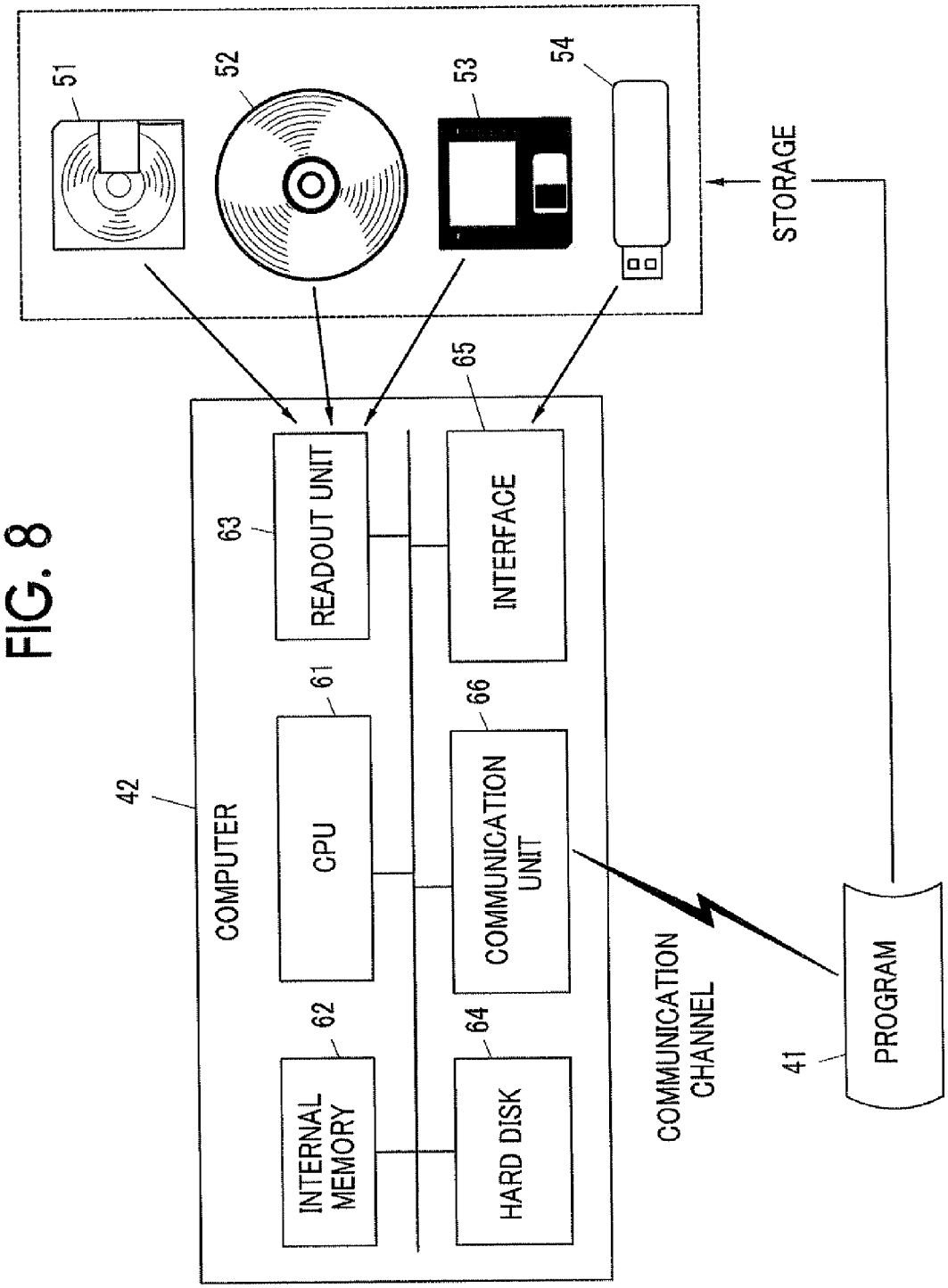
FIG. 8 is an explanatory diagram illustrating an example of a computer program when functions described in the exemplary embodiment of the invention are realized by a computer program, a recording medium having the computer program stored thereon, and a computer.

FIG. 8 is an explanatory diagram illustrating an example of a computer program when functions described in the exemplary embodiment of the invention are realized by a computer program, a recording medium having the computer program stored thereon, and a computer. In the drawing, 41 denotes a program, 42 denotes a computer, 51 denotes a magneto-optical disc, 52 denotes an optical disc, 53 denotes a magnetic disk, 54 denotes a memory, 61 denotes a CPU, 62 denotes an internal memory, 63 denotes a readout unit, 64 denotes a hard disk, 65 denotes an interface, and 66 denotes a communication unit.

The function of each of the units described in the exemplary embodiment of the invention mentioned above may be entirely or partially realized by the program 41 for causing a computer to execute the function. In that case, the program 41, data used by the program and the like may be stored in a recording medium read out by a computer. The recording medium is a medium that causes change states of magnetic, optical, and electrical energy or the like in response to the content description of a program with respect to the readout unit 63 included in hardware resources of a computer, and transfers the content description of a program to the readout unit 63 in the form of signals corresponding thereto. For example, the recording medium includes the magneto-optical disc 51, the optical disc 52 (including a CD, a DVD and the like), the magnetic disk 53, the memory 54 (including an IC card, a memory card, a flash memory and the like) and the like. Of course, the recording medium is not limited to a portable type.

When the program 41 is stored in such a recording medium, the program 41 is read out from a computer, for example, by mounting the recording medium in the readout unit 63 or the interface 65 of the computer 42 and is stored in the internal memory 62 or the hard disk 64 (including a magnetic disk or a silicon disk and the like), and the function described in the exemplary embodiment of the invention mentioned above is all or partially realized by executing the program 41 using the CPU 61. Alternatively, the program 41 is transferred to the computer 42 through a transmission channel, the program 41 is received in the communication unit 66 of the computer 42 and is stored in the internal memory 62 or the hard disk 64, and the above-mentioned function may be realized by executing the program 41 using the CPU 61.

The computer 42 may be connected to various devices through another interface 65. Of course, the configuration may be partially configured by hardware, and may be entirely configured by hardware. Alternatively, the configuration may be configured as a program including all or a portion of the functions described in the exemplary embodiment of the invention along with another configuration. When the configuration is applied to another application, it may be integrated with a program in the application.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A white adjusting device comprising:
a memory containing instructions; and
a processor configured to act on the instructions and act as:
an estimation unit that estimates a color temperature of an image to be processed;
an acquisition unit that acquires a representative color value from a region close to white which is a region in which a color in a color range predetermined from a preset white color value of the image exists;
a calculation unit that calculates a correction representative color value from both a color value corresponding to the color temperature estimated in the estimation unit and the representative color value acquired in the acquisition unit; and
a conversion unit that converts a color of the image so that the correction representative color value is set to the white color value,
wherein the calculation unit calculates the correction representative color value by weighting based on the color temperature so that as the color temperature becomes closer to the white point, the weight of the representative color value becomes bigger than the weight of the color value corresponding to the color temperature, and as the color temperature becomes more distant from the white point, the weight of the color value corresponding to the color temperature becomes bigger than the weight of the representative color value.

2. The white adjusting device according to claim 1, wherein the calculation unit calculates the color value corresponding to the color temperature as the correction representative color value if the color temperature is lower than a first temperature and the first temperature is lower than the temperature of a white point, or if the color temperature is higher than a second temperature and the second temperature is higher than the temperature of the white point.

3. The white adjusting device according to claim 1, wherein the calculation unit calculates the representative color value as the correction representative color value if the color temperature is included in a first range including a white point.

4. A non-transitory computer readable medium storing a program causing a computer to execute the functions of the white adjusting device according to claim 1.

5. A white adjusting method comprising:
estimating a color temperature of an image to be processed;
acquiring a representative color value from a region close to white which is a region in which a color in a color range predetermined from a preset white color value of the image exists;
calculating a correction representative color value from a color value corresponding to the estimated color temperature and the acquired representative color value, by calculating the correction representative color value by weighting based on the color temperature so that as the color temperature becomes closer to the white point, the weight of the representative color value becomes bigger than the weight of the color value corresponding to the color temperature, and as the color temperature becomes more distant from the white point, the weight of the color value corresponding to the color temperature becomes bigger than the weight of the representative color value; and
converting a color of the image so that the correction representative color value is set to the white color value.

6. A white adjusting device comprising:
a memory containing instructions; and
a processor configured to act on the instructions and act as:
an estimation unit that estimates a color temperature from an image to be processed;
an acquisition unit that acquires a representative color value from a region close to white which is a region in which a color in a color range predetermined from a preset white color value of the image exists;
a calculation unit that calculates a correction representative color value from both a color value corresponding to the color temperature estimated in the estimation unit and the representative color value acquired in the acquisition unit; and
a conversion unit that converts a color of the image so that the correction representative color value is set to the white color value,
wherein the calculation unit calculates the color value corresponding to the color temperature as the correction representative color value if the color temperature is lower than a first temperature and the first temperature is lower than the temperature of a white point, or if the color temperature is higher than a second temperature and the second temperature is higher than the temperature of the white point.

7. The white adjusting device according to claim 6, wherein the calculation unit calculates the representative color value as the correction representative color value if the color temperature is included in a first range including a white point.

8. A white adjusting method comprising:
estimating a color temperature of an image to be processed;
acquiring a representative color value from a region close to white which is a region in which a color in a color range predetermined from a preset white color value of the image exists;
calculating a correction representative color value from a color value corresponding to the estimated color temperature and the acquired representative color value, by calculating the color value corresponding to the color temperature as the correction representative color value if the color temperature is lower than a first temperature and the first temperature is lower than the temperature of a white point, or if the color temperature is higher than a second temperature and the second temperature is higher than the temperature of the white point.

* * * * *